United States Patent
Tang et al.

(10) Patent No.: US 11,641,614 B2
(45) Date of Patent: May 2, 2023

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/913,276

(22) Filed: Jun. 26, 2020

(65) Prior Publication Data
US 2020/0329419 A1    Oct. 15, 2020

Related U.S. Application Data (63) Continuation of application No. PCT/CN2017/119049, filed on Dec. 27, 2017.

(51) Int. Cl.
*H04W 40/24* (2009.01)
*H04W 40/20* (2009.01)
*H04W 88/04* (2009.01)

(52) U.S. Cl.
CPC .......... *H04W 40/24* (2013.01); *H04W 40/20* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2004/0192275 A1* | 9/2004 | Kim | H04W 88/04 455/418 |
| 2008/0049688 A1 | 2/2008 | Nakfour et al. | |
| 2008/0096545 A1* | 4/2008 | Delean | H04W 40/20 455/424 |
| 2009/0017814 A1* | 1/2009 | Horiuchi | H04B 7/15557 455/422.1 |

(Continued)

FOREIGN PATENT DOCUMENTS

| | | |
|---|---|---|
| CN | 104469881 A | 3/2015 |
| CN | 104717714 A | 6/2015 |

(Continued)

OTHER PUBLICATIONS

Qualcomm Incorporated, Intel, Huawei, HiSilicon, LG Electronics Inc. 3GPP TSG RAN Meeting #72 RP-161303; Revision of SI: Further Enhancements LTE Device to Device, UE to Network Relays for IoT and Wearables, Busan, Korea, Jun. 13-16, 2016, 7 pages.

(Continued)

*Primary Examiner* — Brian S Roberts
(74) *Attorney, Agent, or Firm* — Ladas & Parry LLP (57) ABSTRACT

Embodiments of the present application provide a data transmission method and a data transmission device. The method includes: receiving, by a first terminal, a first message sent by a second terminal, where a target terminal of the first message is a third terminal; and determining, by the first terminal, whether to relay the first message to the third terminal according to indication information.

18 Claims, 3 Drawing Sheets

(56) References Cited

U.S. PATENT DOCUMENTS

| | | | |
|---|---|---|---|
| 2009/0047898 A1* | 2/2009 | Imamura | H04W 40/22 455/7 |
| 2009/0279553 A1* | 11/2009 | Horu | H04L 12/4633 370/400 |
| 2010/0022184 A1* | 1/2010 | Khoshnevis | H04L 1/1607 455/7 |
| 2012/0087297 A1* | 4/2012 | Park | H04W 40/00 370/315 |
| 2017/0019833 A1 | 1/2017 | Luo et al. | |
| 2017/0086028 A1 | 3/2017 | Hwang et al. | |
| 2017/0086125 A1 | 3/2017 | Seo | |
| 2018/0198539 A1* | 7/2018 | Kim | H04B 7/15528 |

FOREIGN PATENT DOCUMENTS

| | | |
|---|---|---|
| CN | 105992124 A | 10/2016 |
| CN | 106211624 A | 12/2016 |
| JP | 2003087169 A | 3/2003 |
| JP | 2004537934 A | 12/2004 |
| JP | 2017055371 A | 3/2017 |
| JP | 2017524277 A | 8/2017 |
| WO | 2016163733 A1 | 10/2016 |

OTHER PUBLICATIONS

The EESR of corresponding European application No. 17936892.4, dated Sep. 24, 2020.
International Search Report (ISR) with an English translation dated Aug. 31, 2018 for Application No. PCT/CN2017/119049.
The first Office Action of corresponding Korea application No. 10-2020-7021753, dated Sep. 2, 2021.
The first Office Action of corresponding Indian application No. 202017031482, dated Sep. 15, 2021.
The second Office Action of corresponding Korean application No. 10-2020-7021753 , dated Mar. 25, 2022.
Written Opinion of the international Searching Authority dated Aug. 27, 2018 for Application No. PCT/CN2017/119049.
The first Office Action of corresponding Japanese application No. 2020-535231, dated Nov. 30, 2021.
LG Electronics and Radio resource usage for Stateless ProSe UE-to-UE Relay[online] and SA WG2 Meeting #108 S2-151011, [date of search Nov. 15, 2021], Internet <URL: https://www.3gpp.org/ftp/tsg_sa/WG2_Arch/TSGS2_108_Los_Cabos/Docs/S2-151011.zip>, Apr. 7, 2015, p. 1-4.
The First Office Action of corresponding EP application No. 17935892.4, dated Jul. 1, 2022.

* cited by examiner

DATA TRANSMISSION METHOD, TERMINAL DEVICE AND NETWORK DEVICE

CROSS-REFERENCE TO RELATED APPLICATIONS

This application is a continuation of the International Application No. PCT/CN2017/119049, filed on Dec. 27, 2017, the content of which is incorporated herein by reference in its entirety.

TECHNICAL FIELD

Embodiments of the present application relate to the field of communications and, more specifically, to a data transmission method, a terminal device, and a network device.

BACKGROUND

A Device to Device (D2D) terminal pass-through technology, refers to a manner that neighboring terminals perform data transmission through a direct communication path within a short distance. D2D technology does not require a central node (for example, a base station) to forward, so it has higher data rate and lower transmission delay.

In D2D communication, information from a second terminal may also be forwarded to a third terminal through a first terminal, that is, a message, which is to be transmitted, is firstly sent by the second terminal to the first terminal, and then sent by the first terminal to the third terminal. Therefore, how the first terminal determines, after receiving the message to be transmitted, whether to relay the message to the third terminal is a problem that needs to be solved urgently.

SUMMARY

Technical Problem

Embodiments of the present application provide a data transmission method, a terminal device, and a network device. A relay terminal determines whether to relay a specific message according to indication information.

Technical Solutions

In a first aspect, a data transmission method is provided, including: receiving, by a first terminal, a first message sent by a second terminal, where a target terminal of the first message is a third terminal; and determining, by the first terminal, whether to relay the first message to the third terminal according to indication information.

In some possible implementations, the indication information is used to indicate geographic location information.

In some possible implementations, the geographic location information includes at least one of geographic location information of the first terminal, geographic location information of the second terminal, and geographic location information of the third terminal.

In some possible implementations, the determining, by the first terminal, whether to relay the first message to the third terminal according to indication information, includes: determining, by the first terminal, to relay the first message to the third terminal, if the geographic location information of the first terminal meets a first geographic location condition; or determining, by the first terminal, not to relay the first message to the third terminal, if the geographic location information of the first terminal does not meet the first geographic location condition.

In some possible implementations, the determining, by the first terminal, whether to relay the first message to the third terminal according to indication information, includes: determining, by the first terminal, to relay the first message to the third terminal, if the geographic location information of the second terminal meets a second geographic location condition; or determining, by the first terminal, not to relay the first message to the third terminal, if the geographic location information of the second terminal does not meet the second geographic location condition.

In some possible implementations, the determining, by the first terminal, whether to relay the first message to the third terminal according to indication information, includes: determining, by the first terminal, to relay the first message to the third terminal, if the geographic location information of the third terminal meets a third geographic location condition; or determining, by the first terminal, not to relay the first message to the third terminal, if the geographic location information of the third terminal does not meet the third geographic location condition.

In some possible implementations, the first geographic position condition, the second geographic position condition, and the third geographic position condition are configured by a network device, or pre-configured on the first terminal.

In some possible implementations, the geographic location information is absolute geographic location information or relative geographic location information.

In some possible implementations, the indication information is further used to indicate at least one of the following: information of a relay terminal set, information of a sending terminal set, and information of a receiving terminal set; where the relay terminal set is used to indicate a set of terminal devices capable of performing relay transmission on a received message, the sending terminal set is used to indicate a set of terminal devices that a message sent therefrom requires relay transmission, and the receiving terminal set is used to indicate a set of terminal devices that need to receive a message by means of relay transmission.

In some possible implementations, the determining, by the first terminal, whether to relay the first message to the third terminal according to indication information, includes: determining, by the first terminal, to relay the first message to the third terminal, if the first terminal belongs to the relay terminal set; or determining, by the first terminal, not to relay the first message to the third terminal, if the first terminal does not belong to the relay terminal set.

In some possible implementations, the determining, by the first terminal, whether to relay the first message to the third terminal according to indication information, includes: determining, by the first terminal, to relay the first message to the third terminal, if the second terminal belongs to the sending terminal set; or determining, by the first terminal, not to relay the first message to the third terminal, if the second terminal does not belong to the sending terminal set.

In some possible implementations, the determining, by the first terminal, whether to relay the first message to the third terminal according to indication information, includes: determining, by the first terminal, to relay the first message to the third terminal, if the third terminal belongs to the receiving terminal set; or determining, by the first terminal, not to relay the first message to the third terminal, if the third terminal does not belong to the receiving terminal set.

In some possible implementations, the information of the relay terminal set, the information of the sending terminal set, and the information of the receiving terminal set are configured by a network device, or configured by the second terminal.

In some possible implementations, the information of the relay terminal set, the information of the sending terminal set, and the information of the receiving terminal set are identification information of terminal devices.

In some possible implementations, the indication information is further used to indicate signal quality information.

In some possible implementations, the signal quality information includes quality information of signal between the first terminal and the second terminal and/or quality information of signal between the first terminal and the third terminal.

In some possible implementations, the determining, by the first terminal, whether to relay the first message to the third terminal according to indication information, includes: determining, by the first terminal, to relay the first message to the third terminal, if the quality of signal between the first terminal and the second terminal meets a first signal quality condition; or determining, by the first terminal, not to relay the first message to the third terminal, if the quality of signal between the first terminal and the second terminal does not meet the first signal quality condition.

In some possible implementations, the determining, by the first terminal, whether to relay the first message to the third terminal according to indication information, includes: determining, by the first terminal, to relay the first message to the third terminal, if the quality of signal between the first terminal and the third terminal meets a second signal quality condition; or determining, by the first terminal, not to relay the first message to the third terminal, if the quality of signal between the first terminal and the third terminal does not meet the second signal quality condition.

In some possible implementations, the first signal quality condition is a first signal quality threshold, and the second signal quality condition is a second signal quality threshold.

In some possible implementations, the first signal quality condition and the second signal quality condition are configured by a network device, or pre-configured on the first terminal.

In some possible implementations, the indication information is further used to indicate a set of specific resource pools.

In some possible implementations, the determining, by the first terminal, whether to relay the first message to the third terminal according to indication information, includes: determining, by the first terminal, to relay the first message to the third terminal, if a sending resource pool of the first message belongs to the set of specific resource pools; or determining, by the first terminal, not to relay the first message to the third terminal, if the sending resource pool of the first message does not belong to the set of specific resource pools.

In some possible implementations, the indication information is further used to indicate a relay direction of message.

In some possible implementations, the determining, by the first terminal, whether to relay the first message to the third terminal according to indication information, includes: determining, by the first terminal, to relay the first message to the third terminal, if the relay direction of the first message is a first direction; or determining, by the first terminal, not to relay the first message to the third terminal, if the relay direction of the first message is not the first direction.

In some possible implementations, the first direction is configured by a network device, or configured by the second terminal.

In some possible implementations, the indication information is further used to indicate a maximum number of times of relay transmission, and the method further includes: stopping, by the first terminal, relaying the first message to the third terminal when the number of times of relaying the first message reaches the maximum number of times.

In some possible implementations, after the first message is received by the first terminal, the maximum number of times of relay transmission indicated by the indication information comprised in the first message is increased by one or decreased by one, and the modified first message is relayed to the third terminal.

In some possible implementations, the method further includes: receiving, by the first terminal, the indication information sent by a network device.

In some possible implementations, the method further includes: receiving, by the first terminal, the indication information sent by the second terminal.

In some possible implementations, the indication information is sent by the second terminal through a physical layer message, a Media Access Control (MAC) message, a Radio Link Control (RLC) message, a Packet Data Convergence Protocol (PDCP) message, an adaptation layer message or a PC5-Signaling (PC5-S) message.

Therefore, in the data transmission method of the embodiments of the present application, the relay terminal may determine whether to relay the first message to the third terminal according to at least one of the geographic location information, the signal quality information, the information of terminal device sets to which the sending terminal, the relay terminal, and the receiving terminal belong, resource pool information, and relay direction information, thereby flexible relay transmission can be implemented.

In a second aspect, a data transmission method is provided, including: determining, by a network device, indication information, where the indication information is used by a first terminal to determine, when receiving a first message sent by a second terminal, whether to relay the first message to a third terminal; and sending, by the network device, the indication information to the first terminal.

In some possible implementations, the indication information is used to indicate a geographic location condition.

In some possible implementations, the geographic location condition includes at least one of a first geographic location condition corresponding to geographic location information of the first terminal, a second geographic location condition corresponding to geographic location information of the second terminal, and a third geographic location condition corresponding to geographic location information of the third terminal.

In some possible implementations, the geographic location information is absolute geographic location information or relative geographic location information.

In some possible implementations, the indication information is further used to indicate at least one of the following: information of a relay terminal set, information of a sending terminal set, and information of a receiving terminal set; where the relay terminal set is used to indicate a set of terminal devices capable of performing relay transmission on a received message, the sending terminal set is used to indicate a set of terminal devices that a message sent therefrom requires relay transmission, and the receiving terminal set is used to indicate a set of terminal devices that need to receive a message by means of relay transmission.

In some possible implementations, the indication information is further used to indicate a signal quality condition.

In some possible implementations, the signal quality condition includes a first signal quality condition corresponding to quality information of signal between the first terminal and the second terminal and/or a second signal quality condition corresponding to quality information of signal between the first terminal and the third terminal.

In some possible implementations, the indication information is further used to indicate a set of specific resource pools.

In some possible implementations, the indication information is further used to indicate a relay direction of message.

In some possible implementations, the indication information is further used to indicate a maximum number of times of relay transmission.

In a third aspect, a terminal device is provided to perform the methods of the foregoing first aspect or any possible implementations of the first aspect. Specifically, the terminal device includes units for performing the methods of the foregoing first aspect or any possible implementations of the first aspect.

In a fourth aspect, a network device is provided to perform the methods of the foregoing second aspect or any possible implementations of the second aspect. Specifically, the network device includes units for performing the methods of the foregoing second aspect or any possible implementations of the second aspect.

In a fifth aspect, a terminal device is provided. The terminal device includes: a memory, a processor, an input interface, and an output interface. Among them, the memory, the processor, the input interface and the output interface are connected through a bus system. The memory is configured to store instructions, and the processor is configured to execute instructions stored in the memory, so as to execute the methods of the foregoing first aspect or any possible implementations of the first aspect.

In a sixth aspect, a network device is provided. The network device includes: a memory, a processor, an input interface, and an output interface. Among them, the memory, the processor, the input interface and the output interface are connected through a bus system. The memory is used to store instructions, and the processor is used to execute instructions stored in the memory, so as to execute the methods of the foregoing second aspect or any possible implementations of the second aspect.

In a seventh aspect, a computer storage medium is provided, which is configured to store computer software instructions used for executing the methods of the foregoing first aspect or any possible implementations of the first aspect, and includes programs designed to execute the foregoing aspect.

In an eighth aspect, a computer storage medium is provided, which is configured to store computer software instructions used for executing the methods of the foregoing second aspect or any possible implementations of the second aspect, and includes programs designed to execute the foregoing aspect.

In a ninth aspect, a computer program product including instructions is provided, which when executed on a computer, causes the computer to execute the methods of the foregoing first aspect or any possible implementations of the first aspect.

In a tenth aspect, a computer program product including instructions is provided, which when executed on a computer, causes the computer to execute the methods of the foregoing second aspect or any possible implementations of the second aspect.

DESCRIPTION OF EMBODIMENTS

The technical solutions in the embodiments of the present application will be described below in combination with the drawings in the embodiments of the present application.

It should be understood that the technical solutions in the embodiments of the present application can be applied to various communication systems, for example: a long term evolution (LTE) system, an LTE frequency division duplex (FDD) system, an LTE time division duplex (TDD), a 4.5 generation (4.5G) network, a 5th generation (5G) network, a new radio (NR), and the like. The embodiments of the present application can also be applied to a vehicle to everything (V2X) system, such as a vehicle to vehicle (V2V) system; or, it can also be applied to a D2D system, the embodiments of the present application do not limit thereto.

It should be understood that the terminal device in the embodiments of the present application may also be referred as a terminal, a user equipment WE), a mobile station (MS), a mobile terminal (MT), and the like. The terminal device may be a vehicle terminal (VT), for example, a wireless terminal in a vehicle or self driving or the like; or the terminal device may be a pedestrian handheld terminal (PHT), for example, a mobile phone, a Pad, a computer with wireless transceiver function, and the like.

It should be understood that the network device involved in the embodiments of the present application is an apparatus deployed in a wireless access network for providing wireless communication function for the terminal device. The network device may be a base station, and the base station may include various forms of macro base stations, micro base stations, relay stations, access points, and the like. In systems using different wireless access technologies, names of devices with base station function may be different. For example, in an LTE network, it is called evolved nodeB (eNB or eNodeB), and in a 3rd generation (3G) network, it is called node B, and the like.

Figure 1:
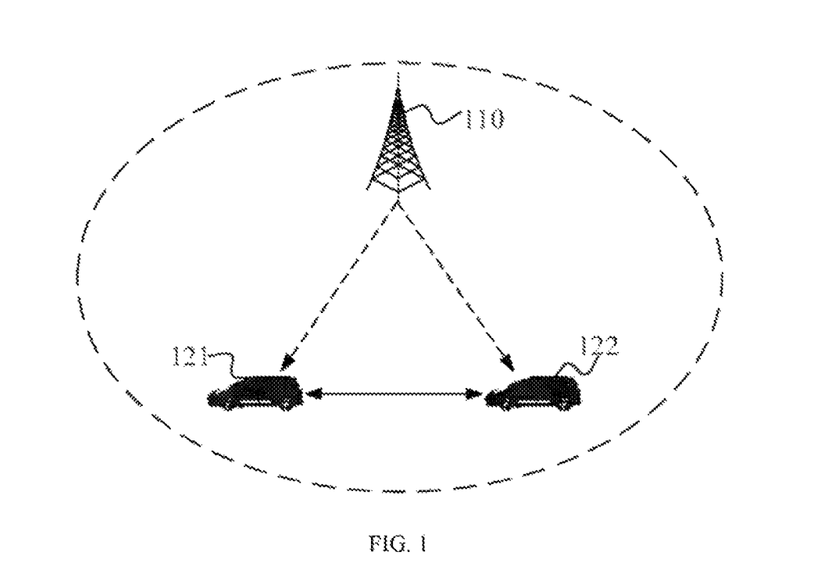
FIG. 1 is a schematic diagram of a communication system according to an embodiment of the present application.

FIG. 1 shows a schematic diagram of a communication system 100 according to an embodiment of the present application. As shown in FIG. 1, the embodiments of the present application can be applied to various application scenarios, here, a network device and a terminal device in an internet of vehicle system are taken as an example to perform illustration, where the network device may be a base station 110, and the terminal device may be a vehicle terminal, for example, vehicle 121 and vehicle 122.

In the internet of vehicle system, a sending terminal can send a message to a relay terminal. How the relay terminal determines, after receiving the message, whether to relay the message to a target terminal (or referred as a receiving terminal) of the message is a problem that needs to be solved urgently.

In view of this, an embodiment of the present application provides a data transmission method, and the relay terminal can determine whether to relay the message to the target terminal.

Figure 2:
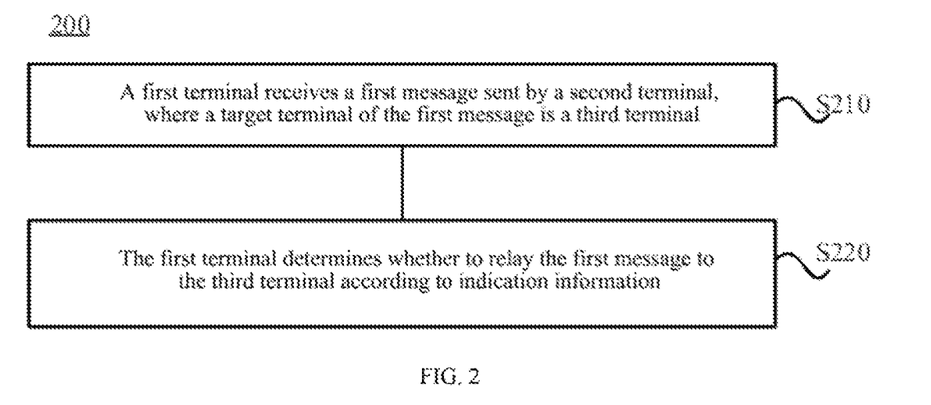
FIG. 2 is a schematic flowchart of a data transmission method according to an embodiment of the present application.

FIG. 2 is a schematic flowchart of a data transmission method 200 according to an embodiment of the present application. The method 200 may be performed by the terminal device in the communication system 100 shown in FIG. 1. As shown in FIG. 2, the method 200 may include the following content:

S210, a first terminal receives a first message sent by a second terminal, where a target terminal of the first message is a third terminal; and S220, the first terminal determines whether to relay the first message to the third terminal according to indication information.

In the embodiments of the present application, the first terminal can receive the first message from the second terminal, and the target terminal of the second terminal is the third terminal, that is, the second terminal is a sending terminal, the third terminal is a receiving terminal, and the first terminal is a relay terminal. In this case, the first terminal can determine whether to relay the first message to the third terminal according to the indication information. The indication information may be sent by a network device to the first terminal, or may be sent by the second terminal to the first terminal. For example, the second terminal may send the indication information to the first terminal through a physical layer (PHY) message, a media access control (MAC) message, a radio link control (RLC) message, a packet data convergence protocol (PDCP) message, an adaptation layer message or a PC5-Signaling (PC5-S) message or the like, which is not limited in the embodiments of the present application.

In the embodiments of the present application, the indication information may be used to indicate the first terminal to determine whether to relay the first message according to specific parameters or information. For example, the indication information may be used to indicate the first terminal to determine whether to relay the first message according to a type of the first message. For example, the first terminal may determine to relay the first message when the type of the first message belongs to a specific type. The specific type may be configured by the network device, or configured by the second terminal, or may be pre-configured on the first terminal, which is not limited in the embodiments of the present application.

In the embodiments of the present application, the indication information may be used to indicate geographic location information, that is, the first terminal can determine whether to relay the first message to the third terminal according to the geographic location information. In an embodiment, the geographic location information includes at least one of geographic location information of the first terminal, geographic location information of the second terminal, and geographic location information of the third terminal. In this case, S220 may include:

the first terminal determines whether to relay the first message to the third terminal according to at least one of the geographic position information of the first terminal, the geographic position information of the second terminal, and the geographic position information of the third terminal.

That is, the first terminal can learn at least one of the geographic location information of the first terminal, the geographic location information of the second terminal (the second terminal can report its own geographic location to the first terminal), and the geographic location information of the third terminal (the third terminal can report its geographic location to the first terminal), and then determine whether to relay the first message to the third terminal according to the above geographic location information.

As an embodiment, the determination performed by the first terminal on whether to relay the first message to the third terminal according to at least one of the geographic location information of the first terminal, the geographic location information of the second terminal, and the geographic location information of the third terminal, may include:

the first terminal determines to relay the first message to the third terminal, if the geographic location information of the first terminal meets a first geographic location condition; or the first terminal determines not to relay the first message to the third terminal, if the geographic location information of the first terminal does not meet the first geographic location condition.

It should be understood that the first geographic location condition may be configured by the network device, may be configured by the second terminal, or may be pre-configured on the first terminal, and the embodiments of the present application do not limit thereto. The first geographic location condition may be a specific geographic location range, and may also be a relative geographic location condition, for example, a location of the first terminal relative to the second terminal, or a location of the first terminal relative to the third terminal and the like, and the embodiments of the present application do not limit thereto.

For example, the first terminal may determine to relay the first message to the third terminal when a geographic location where the first terminal is currently located is within a certain specific geographic location range; otherwise, determine not to relay the first message to the third terminal; or may determine to relay the first message to the third terminal when the geographic location where the first terminal is currently located is out of the certain specific geographic location range, otherwise, determine not to relay the first message to the third terminal.

For another example, the first terminal may determine to relay the first message to the third terminal when a relative geographic location of the first terminal relative to the second terminal is within a certain specific range, otherwise, determine not to relay the first message to the third terminal; or may determine to relay the first message to the third terminal when the relative geographic position of the first terminal relative to the second terminal is out of the certain specific range; otherwise, determine not to relay the first message to the third terminal.

For still another example, the first terminal may determine to relay the first message to the third terminal when a relative geographic location of the first terminal relative to the third terminal is within a certain specific range, otherwise, determine not to relay the first message to the third terminal; or may determine to relay the first message to the third terminal when the relative geographic position of the first terminal relative to the third terminal is out of the certain specific range; otherwise, determine not to relay the first message to the third terminal.

As another embodiment, the determination performed by the first terminal on whether to relay the first message to the third terminal according to at least one of the geographic location information of the first terminal, the geographic location information of the second terminal, and the geographic location information of the third terminal, may include:

the first terminal determines to relay the first message to the third terminal, if the geographic location information of the second terminal meets a second geographic location condition; or the first terminal determines not to relay the first message to the third terminal, if the geographic location information of the second terminal does not meet the second geographic location condition.

Similar to the foregoing first geographic location condition, the second geographic location condition may be configured by the network device, may be configured by the second terminal, or may be pre-configured on the first terminal. The second geographic location condition may be a specific geographic location range, and may also be a relative geographic location condition, for example, a location of the second terminal relative to the first terminal or the like.

For example, the first terminal may determine to relay the first message to the third terminal when a geographic location where the second terminal is currently located is within a certain specific geographic range, otherwise, determine not to relay the first message to the third terminal; or may determine to relay the first message to the third terminal when the geographic location where the second terminal is currently located is out of the certain specific geographic location range, otherwise, determine not to relay the first message to the third terminal.

For another example, the first terminal may determine to relay the first message to the third terminal when a relative geographic location of the second terminal relative to the first terminal is within a certain specific range, otherwise, determine not to relay the first message to the third terminal; or may determine to relay the first message to the third terminal when the relative geographic position of the second terminal relative to the first terminal is out of the certain specific range; otherwise, determine not to relay the first message to the third terminal.

As still another embodiment, the determination performed by the first terminal on whether to relay the first message to the third terminal according to at least one of the geographic location information of the first terminal, the geographic location information of the second terminal, and the geographic location information of the third terminal, may include:

the first terminal determines to relay the first message to the third terminal, if the geographic location information of the third terminal meets a third geographic location condition; or the first terminal determines not to relay the first message to the third terminal, if the geographic location information of the third terminal does not meet the third geographic location condition.

Similar to the foregoing first and second geographic location conditions, the third geographic location condition may be configured by the network device, may be configured by the second terminal, or may be pre-configured on the first terminal, the third geographic location condition may be a specific geographic location range or a relative geographic location condition, for example, a location of the third terminal relative to the first terminal or the like.

For example, the first terminal may determine to relay the first message to the third terminal when a geographic location where the third terminal is currently located is within a certain specific geographic location range, otherwise, determine not to relay the first message to the third terminal; or may determine to relay the first message to the third terminal when the geographic location where the third terminal is currently located is out of the certain specific geographic location range, otherwise, determine not to relay the first message to the third terminal.

For another example, the first terminal may determine to relay the first message to the third terminal when a relative geographic location of the third terminal relative to the first terminal is within a certain specific range, otherwise, determine not to relay the first message to the third terminal; or may determine to relay the first message to the third terminal when the relative geographic location of the third terminal relative to the first terminal is out of the certain specific range; otherwise, determine not to relay the first message to the third terminal.

In the embodiments of the present application, the first terminal may also determine whether to relay the first message to the third terminal by comprehensively considering the geographic location information of at least two terminal devices among the first terminal, the second terminal, and the third terminal, the specific implementation is similar, and details are not described herein again.

In the embodiments of the present application, the indication information is further used to indicate at least one of the following:

information of a relay terminal set, information of a sending terminal set, and information of a receiving terminal set;

where, the relay terminal set is used to indicate a set of terminal devices capable of performing relaying transmission on a received message, the sending terminal set is used to indicate a set of terminal devices that a message sent therefrom requires relay transmission, and the receiving terminal set is used to indicate a set of terminal devices that need to receive a message by means of relay transmission.

In this case, S220 may include:

the first terminal determines whether to relay the first message to the third terminal according to at least one of the information of the relay terminal set, the information of the sending terminal set, and the information of the receiving terminal set.

As an embodiment, the determination performed by the first terminal on whether to relay the first message to the third terminal according to at least one of the information of the relay terminal set, the information of the sending terminal set, and the information of the receiving terminal set includes:

the first terminal determines to relay the first message to the third terminal, if the first terminal belongs to the relay terminal set; or the first terminal determines not to relay the first message to the third terminal, if the first terminal does not belong to the relay terminal set.

That is, the first terminal relays the first message to the third terminal only when the first terminal (that is, the relay terminal) belongs to a specific terminal device set, for example, the specific terminal device set may be a cluster head or a cluster tail in each user group, or may be a group of terminal devices that meet a certain condition, which is not limited in the embodiments of the present application.

It should be understood that the relay terminal set may be configured by the network device to the first terminal, or may be configured by the second terminal to the first terminal, which is not limited in the embodiments of the present application, and the indication information may be used to indicate identification information of a group of terminal devices, only the terminal devices in the relay terminal set can be used as relay terminal to relay the received message to the target terminal of the message.

As another embodiment, the determination performed by the first terminal on whether to relay the first message to the third terminal according to at least one of the information of the relay terminal set, the information of the sending terminal set, and the information of the receiving terminal set includes:

the first terminal determines to relay the first message to the third terminal, if the second terminal belongs to the sending terminal set; or the first terminal determines not to relay the first message to the third terminal, if the second terminal does not belong to the sending terminal set.

That is, the first terminal relays the first message to the third terminal only when the second terminal (that is, the sending terminal) belongs to a specific terminal device set, that is, the first terminal only relays messages sent by the terminal devices in the specific terminal device set. In an embodiment, the specific terminal device set may be a cluster head or a cluster tail in each user group, or may be a group of terminal devices that meet a certain condition, which is not limited in the embodiments of the present application.

It should be understood that the sending terminal set may be configured by the network device to the first terminal, or may be configured by the second terminal to the first terminal, and the indication information may be used to indicate identification information of a group of terminal devices. Only messages sent by terminal devices in the sending terminal set can be relayed to the target terminal of the message through the relay terminal.

As still another embodiment, the determination performed by the first terminal on whether to relay the first message to the third terminal according to the indication information includes:

the first terminal determines to relay the first message to the third terminal, if the third terminal belongs to the receiving terminal set; or the first terminal determines not to relay the first message to the third terminal, if the third terminal does not belong to the receiving terminal set.

That is, the first terminal relays the first message to the third terminal when the third terminal (that is, the receiving terminal) belongs to a specific terminal device set, that is, the first terminal only relays messages to be sent to terminal devices in the specific terminal device set. In an embodiment, the specific terminal device set may be a cluster head or a cluster tail in each user group, or may be a group of terminal devices that meet a certain condition, which is not limited in the embodiments of the present application.

It should be understood that the receiving terminal set may be configured by the network device to the first terminal, or may be configured by the second terminal to the first terminal, and the indication information may be used to indicate identification information of a group of terminal devices. Only messages to be sent to terminal devices in the receiving terminal set can (or need) be relayed through the relay terminal.

In the embodiments of the present application, the first terminal may also determine whether to relay the first message to the third terminal by comprehensively considering the relationship between the corresponding terminal device set and at least two terminal devices of the first terminal, the second terminal and the third terminal, the specific implementation is similar, and details are not described herein again.

In the embodiments of the present application, the indication information is further used to indicate signal quality information. In a specific embodiment, the signal quality information includes quality information of signal between the first terminal and the second terminal and/or quality information of signal between the first terminal and the third terminal, in this case, S220 may include:

the first terminal determines whether to relay the first message to the third terminal according to the quality information of signal between the first terminal and the second terminal and/or the quality information of signal between the first terminal and the third terminal.

That is, the first terminal can measure the quality information of signal between the first terminal and the second terminal and/or the quality information of signal between the first terminal and the third terminal, and then determine whether to relay the first message to the third terminal according to the above measured signal quality information.

As an embodiment, the determination performed by the first terminal on whether to relay the first message to the third terminal according to the quality information of signal between the first terminal and the second terminal and/or the quality information of signal between the first terminal and the third terminal, includes:

the first terminal determines to relay the first message to the third terminal, if the quality of signal between the first terminal and the second terminal meets a first signal quality condition; or the first terminal determines not to relay the first message to the third terminal, if the quality of signal between the first terminal and the second terminal does not meet the first signal quality condition.

It should be noted that the first signal quality condition may be a specific signal quality threshold or a signal quality range or the like, which is not limited in the embodiments of the present application. For example, the first terminal may determine to relay the first message to the third terminal when the quality of signal between the first terminal and the second terminal is higher or lower than the specific signal quality threshold, otherwise, determine not to relay the first message to the third terminal, where the first signal quality condition may be configured by the network device to the first terminal or may be configured by the second terminal to the first terminal, which is not limited in the embodiments of the present application.

As another embodiment, the determination performed by the first terminal on whether to relay the first message to the third terminal according to the quality information of signal between the first terminal and the second terminal and/or the quality information of signal between the first terminal and the third terminal, includes:

the first terminal determines to relay the first message to the third terminal, if the quality of signal between the first terminal and the third terminal meets a second signal quality condition; or the first terminal determines not to relay the first message to the third terminal, if the quality of signal between the first terminal and the third terminal does not meet the second signal quality condition.

It should be noted that, similar to the first signal quality condition, the second signal quality condition may be a specific signal quality threshold or a signal quality range or the like, which is not limited in the embodiments of the present application. For example, the first terminal may determine to relay the first message to the third terminal when the quality of signal between the first terminal and the third terminal is higher or lower than the specific signal quality threshold. The second signal quality condition may be configured by the network device or configured by the second terminal, which is not limited in the embodiments of the present application.

In the embodiments of the present application, the first terminal may also determine whether to relay the first message to the third terminal according to the quality information of signal between the first terminal and the second terminal, and the quality information of signal between the first terminal and the third terminal. For example, the first terminal may determine to relay the first message to the third terminal when the quality information of signal between the first terminal and the second terminal meets the first signal quality condition, and the quality information of signal between the first terminal and the third terminal meets the second signal quality condition, or determine not to relay the first message to the third terminal when any condition of the above two conditions is not met, which is not limited in the embodiments of the present application.

In the embodiments of the present application, the indication information may also be used to indicate a set of specific resource pools. In this case, the S220 may include:

the first terminal determines to relay the first message to the third terminal, if a sending resource pool of the first message belongs to the set of specific resource pools; or the first terminal determines not to relay the first message to the third terminal, if the sending resource pool of the first message does not belong to the set of specific resource pools.

That is, only messages sent through the specific resource pools can be relayed by the relay terminal. Thus, after receiving the first message, the first terminal can determine whether the sending resource pool of the first message belongs to the set of specific resource pools, if yes, determine to relay the first message, otherwise, determine not to relay the first message. Alternatively, only messages sent through other resource pools except the specific resource pools can be relayed by the relay terminal, which is not limited in the embodiments of the present application.

In the embodiments of the present application, the indication information may also be used to indicate a relay direction of message. In this case, S220 may include:

the first terminal determines whether to relay the first message to the third terminal according to a relay direction of the first message.

In a specific embodiment, the determination performed by the first terminal on whether to relay the first message to the third terminal according to the relay direction of the first message, includes:

the first terminal determines to relay the first message to the third terminal, if the relay direction of the first message is a first direction; or the first terminal determines not to relay the first message to the third terminal, if the relay direction of the first message is not the first direction.

Where, the first direction is configured by the network device to the first terminal, or configured by the second terminal to the first terminal. After receiving the first message, the first terminal may determine the relay direction of the first message according to a relative position between the first terminal and the second terminal, and/or a relative position between the first terminal and the third terminal, and may further determine whether the relay direction is the first direction, if yes, determine to relay the first message; otherwise, determine not to relay the first message. Alternatively, the first terminal may determine to relay the first message when the relay direction of the first message is not the first direction; otherwise, determine not to relay the first message.

In the embodiments of the present application, the first terminal may also determine whether to relay the first message to the third terminal by comprehensively considering at least two of the geographic location information, the signal quality information, the information of the terminal device set to which the sending terminal, the relay terminal, and the receiving terminal belong, resource pool information, and relay direction information. The specific implementations may refer to related descriptions in the foregoing embodiments, and details are not described herein again.

In the embodiments of the present application, the indication information is further used to indicate a maximum number of times of relay transmission. In this case, the method 20 may further include:

stopping, by the first terminal, relaying the first message to the third terminal when the number of times of relaying the first message reaches the maximum number of times.

In an embodiment, the indication information may be a counter. Each time the first message is relayed by the first terminal, the maximum number of times of relay transmission indicated by the indication information included in the first message is increased by one or decreased by one, and the modified first message is relayed to the third terminal. The relaying of the first message is stopped when a count value of the counter reaches a specific value. For example, the count value of the counter is zero at beginning, and the relaying of the first message is stopped when the count value of the counter reaches the maximum number of times, or, the count value of the counter is the maximum number of times at beginning, and the relaying of the first message is stopped when the count value of the counter is zero.

Therefore, in the data transmission method of the embodiments of the present application, the relay terminal can determine whether to relay the first message to the third terminal according to at least one of the geographic location information, the signal quality information, the information of the terminal device set to which the sending terminal, the relay terminal, and the receiving terminal belong, resource pool information, and relay direction information, thereby implementing a flexible relay transmission.

The data transmission method according to the embodiments of the present application is described in detail from a perspective of a terminal device in combination with FIG. 2 above, and the data transmission method according to another embodiment of the present application is described in detail from a perspective of a network device in combination with FIG. 3 hereinafter. It should be understood that the description on the network device side and the description on the terminal device side correspond to each other. Similar descriptions may be referred to above, and details are not described herein again to avoid repetition.

Figure 3:
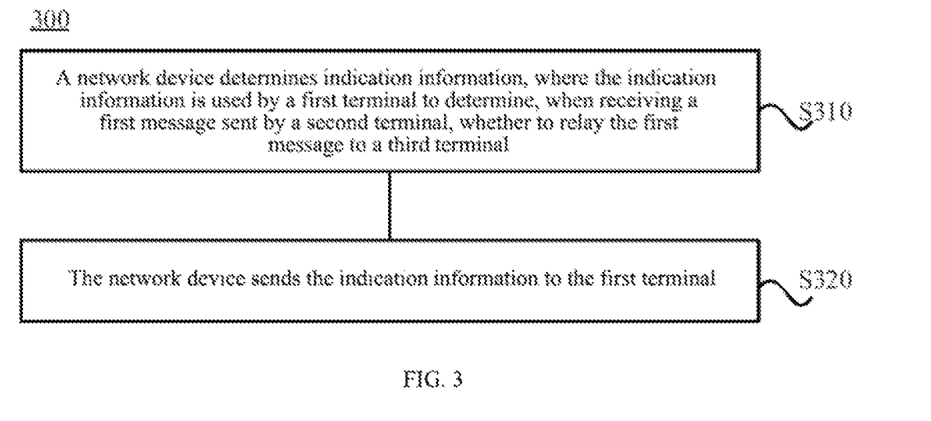
FIG. 3 is a schematic flowchart of a data transmission method according to an embodiment of the present application.

FIG. 3 is a schematic flowchart of a method 300 for transmitting data according to another embodiment of the present application. The method 300 may be performed by the network device in the internet of vehicle system shown in FIG. 1, as shown in FIG. 3, the method 300 includes the following content:

S310, a network device determines indication information, where the indication information is used by a first terminal to determine, when receiving a first message sent by a second terminal, whether to relay the first message to a third terminal.

S320, the network device sends the indication information to the first terminal.

In some embodiments, the indication information is used to indicate a geographic location condition.

In some embodiments, the geographic location condition includes at least one of a first geographic location condition corresponding to geographic location information of the first terminal, a second geographic location condition corresponding to geographic location information of the second terminal, and a third geographic location condition corresponding to geographic location information of the third terminal.

In some embodiments, the geographic location information is absolute geographic location information or relative geographic location information.

In some embodiments, the indication information is further used to indicate at least one of the following:

information of a relay terminal set, information of a sending terminal set, and information of a receiving terminal set:

where, the relay terminal set is used to indicate a set of terminal devices capable of performing relay transmission on a received message, the sending terminal set is used to indicate a set of terminal devices that a message sent therefrom requires relay transmission, and the receiving terminal set is used to indicate a set of terminal devices that need to receive a message by means of relay transmission.

In an embodiment, in some embodiments, the indication information is further used to indicate a signal quality condition.

In some embodiments, the signal quality condition includes a first signal quality condition corresponding to quality information of signal between the first terminal and the second terminal and/or a second signal quality condition corresponding to quality information of signal between the first terminal and the third terminals.

In an embodiment, in some embodiments, the indication information is further used to indicate a set of specific resource pools.

In some embodiments, the indication information is used to indicate a relay direction of message.

In some embodiments, the indication information is further used to indicate a maximum number of times of relay transmission.

In the embodiments of the present application, the content of the method 300 may also be performed by the second terminal, that is, the sending terminal. For brevity, details are not described herein again.

The method embodiments of the present application are described in detail above in combination with FIG. 2 and FIG. 3, and the device embodiments of the present application will be described in detail below in combination with FIG. 4 to FIG. 7. It should be understood that the device embodiments and the method embodiments correspond to each other, similarly description may refer to the method embodiments.

Figure 4:
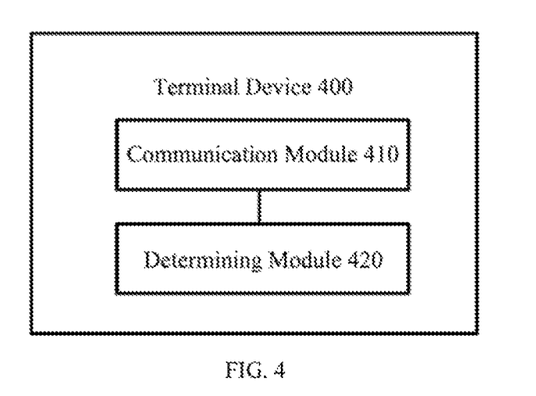
FIG. 4 is a schematic block diagram of a terminal device according to an embodiment of the present application.

FIG. 4 shows a schematic block diagram of a terminal device 400 according to an embodiment of the present application. As shown in FIG. 4, the terminal device 400 includes:

a communication module 410, configured to receive a first message sent by a second terminal, where a target terminal of the first message is a third terminal; and a determining module 420, configured to determine whether to relay the first message to the third terminal according to indication information.

In some embodiments, the indication information is used to indicate geographic location information.

In some embodiments, the geographic location information includes at least one of geographic location information of the terminal device, geographic location information of the second terminal, and geographic location information of the third terminal.

In some embodiments, the determining module 420 is specifically configured to:

determine to relay the first message to the third terminal, if the geographic location information of the terminal device meets a first geographic location condition; or determine not to relay the first message to the third terminal, if the geographic location information of the terminal device does not meet the first geographic location condition.

In some embodiments, the determining module 420 is specifically configured to:

determine to relay the first message to the third terminal, if the geographic location information of the second terminal meets a second geographic location condition; or determine not to relay the first message to the third terminal, if the geographic location information of the second terminal does not meet the second geographic location condition.

In some embodiments, the determining module 420 is specifically configured to:

determine to relay the first message to the third terminal, if the geographic location information of the third terminal meets a third geographic location condition; or determine not to relay the first message to the third terminal, if the geographic location information of the third terminal does not meet the third geographic location condition.

In some embodiments, the first geographic location condition, the second geographic location condition, and the third geographic location condition are configured by the network device or pre-configured on the terminal device.

In some embodiments, the geographic location information is absolute geographic location information or relative geographic location information.

In some embodiments, the indication information is further used to indicate at least one of the following:

information of a relay terminal set, information of a sending terminal set, and information of a receiving terminal set;

where, the relay terminal set is used to indicate a set of terminal devices capable of performing relay transmission on a received message, the sending terminal set is used to indicate a set of terminal devices that a message sent therefrom requires relay transmission, and the receiving terminal set is used to indicate a set of terminal devices that need to receive a message by means of relay transmission.

In some embodiments, the determining module 420 is specifically configured to:

determine to relay the first message to the third terminal, if the terminal device belongs to the relay terminal set; or determine not to relay the first message to the third terminal, if the terminal device does not belong to the relay terminal set.

In some embodiments, the determining module 420 is specifically configured to:

determine to relay the first message to the third terminal, if the second terminal belongs to the sending terminal set; or determine not to relay the first message to the third terminal, if the second terminal does not belong to the sending terminal set.

In some embodiments, the determining module 420 is specifically configured to:

determine to relay the first message to the third terminal, if the third terminal belongs to the receiving terminal set; or determine not to relay the first message to the third terminal, if the third terminal does not belong to the receiving terminal set.

In some embodiments, the information of the relay terminal set, the information of the sending terminal set, and the information of the receiving terminal set are configured by the network device or configured by the second terminal.

In some embodiments, the information of the relay terminal set, the information of the transmitting terminal set, and the information of the receiving terminal set are identification information of terminal devices.

In some embodiments, the indication information is used to indicate signal quality information.

In some embodiments, the signal quality information includes quality information of signal between the terminal device and the second terminal and/or quality information of signal between the terminal device and the third terminal.

In some embodiments, the determining module 420 is specifically configured to:

determine to relay the first message to the third terminal, if the quality of signal between the terminal device and the second terminal meets a first signal quality condition; or determine not to relay the first message to the third terminal, if the quality of signal between the terminal device and the second terminal does not meet the first signal quality condition.

In some embodiments, the determining module 420 is specifically configured to:

determine to relay the first message to the third terminal, if the quality of signal between the terminal device and the third terminal meets a second signal quality condition; or determine not to relay the first message to the third terminal, if the quality of signal between the terminal device and the third terminal does not meet the second signal quality condition.

In some embodiments, the first signal quality condition is a first signal quality threshold, and the second signal quality condition is a second signal quality threshold.

In some embodiments, the first signal quality condition and the second signal quality condition are configured by the network device, or pre-configured on the terminal device.

In some embodiments, the indication information is further used to indicate a set of specific resource pools.

In some embodiments, the determining module 420 is specifically configured to:

determine to relay the first message to the third terminal, if a sending resource pool of the first message belongs to the set of specific resource pools; or determine not to relay the first message to the third terminal, if the sending resource pool of the first message does not belong to the set of specific resource pools.

In some embodiments, the indication information is further used to indicate a relay direction of message.

In some embodiments, the determining module 420 is specifically configured to:

determine to relay the first message to the third terminal, if the relay direction of the first message is a first direction; or determine not to relay the first message to the third terminal, if the relay direction of the first message is not the first direction.

In some embodiments, the first direction is configured by the network device or configured by the second terminal.

In some embodiments, the indication information is further used to indicate a maximum number of times of relay transmission, and the communication module 410 is further configured to:

stop relaying the first message to the third terminal, when the number of times of relaying the first message reaches the maximum number of times.

In some embodiments, after the first message is received by the terminal device, the maximum number of times of relay transmission indicated by the indication information included in the first message is increased by one or decreased by one, and the modified first message is relayed to the third terminal.

In some embodiments, the communication module 410 is further configured to:

receive the indication information sent by a network device.

In some embodiments, the communication module 410 is further configured to:

receive the indication information sent by the second terminal.

In some embodiments, the indication information is sent by the second terminal through a physical layer message, a media access control (MAC) message, a radio link control (RLC) message, a packet data convergence protocol (PDCP) message, an adaptation layer message or a PC5-S message.

It should be understood that the terminal device 400 according to the embodiments of the present application may correspond to the first terminal in the method embodiments of the present application, and the above and other operations and/or functions of each unit in the terminal device 400 are respectively for implementing the corresponding process of the first terminal in the method 200 as shown in FIG. 2. For brevity, details are not described herein again.

Figure 5:
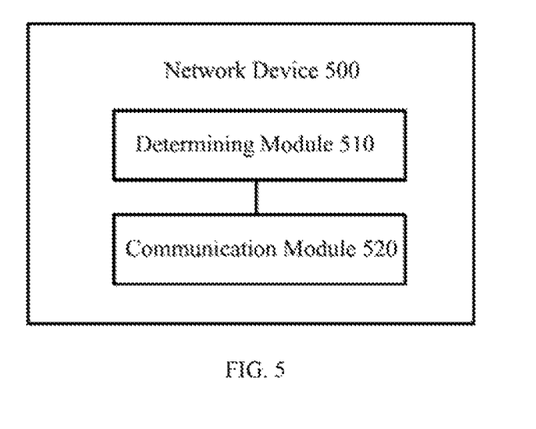
FIG. 5 is a schematic block diagram of a network device according to an embodiment of the present application.

FIG. 5 is a schematic block diagram of a network device according to an embodiment of the present application. The network device 500 in FIG. 5 includes:

a determining module 510, configured to determine indication information, where the indication information is used by a first terminal to determine, when receiving a first message sent by a second terminal, whether to relay the first message to a third terminal; and a communication module 520, configured to send the indication information to the first terminal.

In some embodiments, the indication information is used to indicate a geographic location condition.

In some embodiments, the geographic location condition includes at least one of a first geographic location condition corresponding to geographic location information of the first terminal, a second geographic location condition corresponding to geographic location information of the second terminal, and a third geographic location condition corresponding to geographic location information of the third terminal.

In some embodiments, the geographic location information is absolute geographic location information or relative geographic location information.

In some embodiments, the indication information is further used to indicate at least one of the following:

information of a relay terminal set, information of a sending terminal set, and information of a receiving terminal set;

where, the relay terminal set is used to indicate a set of terminal devices capable of performing relay transmission on a received message, the sending terminal set is used to indicate a set of terminal devices that a message sent therefrom requires relay transmission, and the receiving terminal set is used to indicate a set of terminal devices that need to receive a message by means of relay transmission.

In some embodiments, the indication information is further used to indicate a signal quality condition.

In some embodiments, the signal quality condition includes a first signal quality condition corresponding to quality information of signal between the first terminal and the second terminal and/or a second signal quality condition corresponding to quality information of signal between the first terminal and the third terminal.

In some embodiments, the indication information is further used to indicate a set of specific resource pools.

In some embodiments, the indication information is used to indicate a relay direction of message.

In some embodiments, the indication information is further used to indicate a maximum number of times of relay transmission.

Specifically, the network device 50 may correspond to (for example, may be configured to or itself be) the network device described in the foregoing method 300, and each module or unit in the network device 500 is respectively configured to perform each action or processing process performed by the network device in the foregoing method 300, and detailed description is omitted here to avoid repetition.

Figure 6:
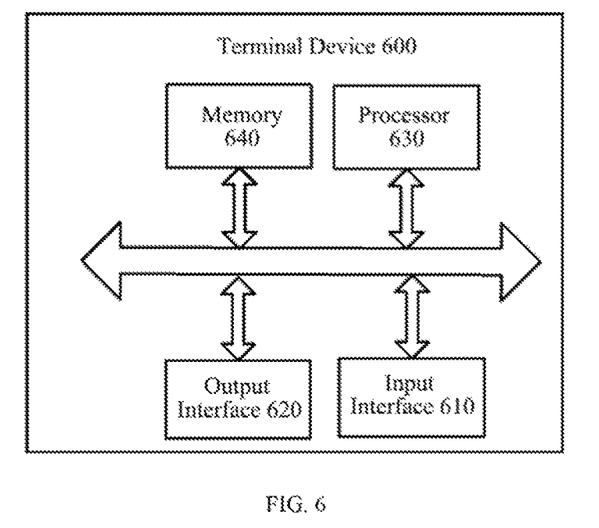
FIG. 6 is a schematic block diagram of a terminal device according to an embodiment of the present application.

As shown in FIG. 6, an embodiment of the present application further provides a terminal device 600 for transmitting data. The terminal device 600 may be the terminal device 400 in FIG. 4, which can be configured to perform the content of the first terminal corresponding to the method 200 in FIG. 2. The terminal device 600 includes: an input interface 610, an output interface 620, a processor 630, and a memory 640. The input interface 610, the output interface 620, the processor 630, and the memory 640 may be connected through a bus system. The memory 640 is configured to store programs, instructions, or codes. The processor 630 is configured to execute the programs, the instructions, or the codes in the memory 640 to control the input interface 610 to receive signals, control the output interface 620 to send signals, and complete operations in the foregoing method embodiments.

It should be understood that, in the embodiments of the present application, the processor 630 may be a central processing unit (CPU), and the processor 630 may also be other general-purpose processor, a digital signal processor (DSP), an application specific integrated circuit (ASIC), a field programmable gate array (FPGA) or other programmable logic devices, a discrete gate or a transistor logic device, a discrete hardware component, or the like. A general-purpose processor may be a microprocessor or the processor may be any conventional processor or the like.

The memory 640 may include a read-only memory and a random access memory, and provide instructions and data to the processor 630. A part of the memory 640 may further include a non-volatile random access memory. For example, the memory 640 may also store information of a device type.

In an implementation process, any content of the above methods may be completed through an integrated logic circuit of hardware or instructions in a form of software in the processor 630. The content in combination with the methods disclosed in the embodiments of the present application may be directly embodied as performed by a hardware processor, or may be performed by a combination of hardware and software modules in the processor. The software module may be located in a conventional storage medium in the art such as random access memory, flash memory, read-only memory, programmable read-only memory, or electrically erasable programmable memory, register, or the like. The storage medium is located in the memory 640, and the processor 630 reads information in the memory 640 and combines its hardware to complete the content of the above methods. To avoid repetition, it will not be described in detail here.

In a specific implementation, the determining module 420 included in the terminal device 400 in FIG. 4 may be implemented using the processor 630 of FIG. 6, and the communication module 410 included in the terminal device 400 in FIG. 4 may be implemented using the input interface 610 and the output interface 620 of FIG. 6.

Figure 7:
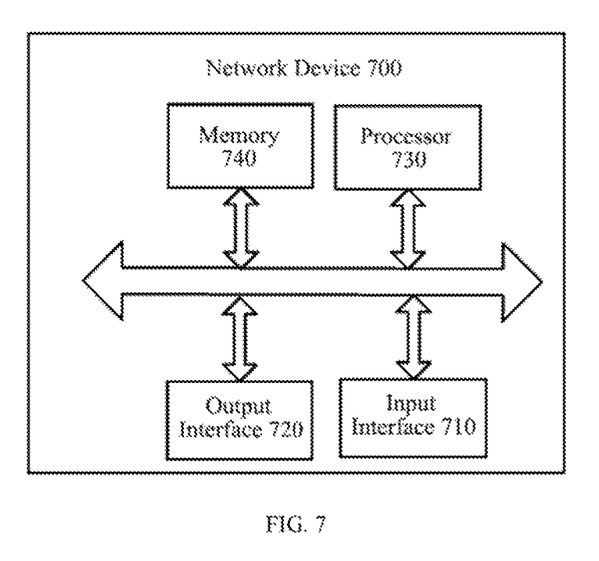
FIG. 7 is a schematic block diagram of a network device according to an embodiment of the present application.

As shown in FIG. 7, an embodiment of the present application further provides a network device 700. The network device 700 may be the network device 500 in FIG. 5, which can be configured to perform the content of the network device corresponding to the method 300 in FIG. 3. The network device 700 includes: an input interface 710, an output interface 720, a processor 730, and a memory 740. The input interface 710, the output interface 720, the processor 730, and the memory 740 may be connected through a bus system. The memory 740 is configured to store programs, instructions, or codes. The processor 730 is configured to execute the programs, the instructions, or the codes in the memory 740 to control the input interface 710 to receive signals, control the output interface 720 to send signals, and complete operations in the foregoing method embodiments.

It should be understood that, in the embodiments of the present application, the processor 730 may be a central processing unit (CPU), and the processor 730 may also be other general-purpose processor, a digital signal processor (DSP), an application specific integrated circuit (ASIC), a field programmable gate array (FPGA) or other programmable logic devices, a discrete gate or a transistor logic device, a discrete hardware component, or the like. A general-purpose processor may be a microprocessor or the processor may be any conventional processor or the like.

The memory 740 may include a read-only memory and a random access memory, and provide instructions and data to the processor 730. Apart of the memory 740 may further include a non-volatile random access memory. For example, the memory 740 may also store information of a device type.

In an implementation process, any content of the above methods may be completed through an integrated logic circuit of hardware or instructions in a form of software in the processor 730. The content in combination with the methods disclosed in the embodiments of the present application may be directly embodied as performed by a hardware processor, or may be performed by a combination of hardware and software modules in the processor. The software module may be located in a conventional storage medium in the art such as random access memory, flash memory, read-only memory, programmable read-only memory, or electrically erasable programmable memory, register, or the like. The storage medium is located in the memory 740, and the processor 730 reads information in the memory 740 and combines its hardware to complete the content of the above methods. To avoid repetition, it will not be described in detail here.

In a specific implementation, the determining module 510 included in the network device 500 in FIG. 5 may be implemented using the processor 730 of FIG. 7, and the communication module 520 included in the network device 500 in FIG. 5 may be implemented using the input interface 710 and the output interface 720 of FIG. 7.

An embodiment of the present application further proposes a computer-readable storage medium, where the computer-readable storage medium stores one or more programs, the one or more programs include instructions, and the instructions, when executed by a portable electronic device including multiple application programs, can cause the portable electronic device to execute the methods of the embodiments shown in FIG. 2 and FIG. 3.

An embodiment of the present application also proposes a computer program. The computer program includes instructions. The computer program, when executed by a computer, causes the computer to execute the corresponding processes of the methods of embodiments shown in FIG. 2 and FIG. 3.

Those of ordinary skill in the art may appreciate that the units and algorithm steps of the various examples described in combination with the embodiments disclosed herein can be implemented by electronic hardware, or a combination of computer software and electronic hardware. Whether these functions are performed in hardware or software depends on specific applications and design constraints of the technical solutions. A person skilled in the art can use different methods to implement the described functions for each specific application, but such implementation should not be considered to be beyond the scope of the present application.

A person skilled in the art can clearly understand that, for the convenience and brevity of description, the specific operation processes of the systems, devices, and units described above may refer to the corresponding processes in the foregoing method embodiments, details are not described herein again.

In the several embodiments provided in the present application, it should be understood that the disclosed systems, devices, and methods may be implemented in other ways. For example, the device embodiments described above are merely illustrative. For example, the division of the unit is only a logical function division. In an actual implementation, there may be another division manner. For example, multiple units or components may be combined or may be integrated into another system, or some features can be ignored or not executed. In addition, the shown or discussed coupling or direct coupling or communication connection between each other may be an indirect coupling or communication connection through some interfaces, devices or units, and may be in electrical, mechanical or other forms.

The units described as separate components may or may not be physically separated, and the components displayed as units may or may not be physical units, that is, may be located in one place, or may be distributed to multiple network units. Some or all of the units may be selected according to actual needs to implement the purpose of the solution of the present embodiment.

In addition, each functional unit in each embodiment of the present application may be integrated into one processing unit, or each unit may exist physically separately, or two or more units may be integrated into one unit.

This functionality, if implemented as a software functional unit and sold or used as a standalone product, can be stored in a computer readable storage medium. Based on such understanding, the technical solution of the present application essentially, or a part of contributing to the prior art, or a part of the technical solution, may be embodied in a form of a software product, the computer software product is stored in a storage medium, which includes a number of instructions for causing a computer device (which may be a personal computer, server, or network device, or the like) to perform all or part of the steps of various embodiments of the present application. The foregoing storage medium includes various medium that can store program codes: a U disk, a mobile hard disk, a read-only memory (ROM), a random access memory (RAM), a magnetic disk, or an optical disk, or the like.

The above mentioned are only specific implementations of the present application, but the protection scope of the present application is not limited thereto. Any person skilled in the art can easily think of changes or substitutions within the technical scope disclosed in the present application, which should be covered in the protection scope of the present application. Therefore, the protection scope of the present application should be determined by the protection scope of the claims.

What is claimed is:

1. A data transmission method, comprising:
receiving, by a first terminal, a first message sent by a second terminal, wherein a target terminal of the first message is a third terminal; and
determining, by the first terminal, whether to relay the first message to the third terminal according to indication information;
wherein the indication information is used to indicate signal quality information and at least one of:
geographic location information, information of terminal device sets to which a sending terminal, a relay terminal, and a receiving terminal belong, a set of specific resource pools, and a relay direction of a message;
wherein the information of terminal device sets to which the sending terminal, the relay terminal, and the receiving terminal belong comprises one of the following:
information of a relay terminal set,
information of a sending terminal set,
both of the information of the relay terminal set and the information of the sending terminal set,
both of the information of the relay terminal set and information of a receiving terminal set,
both of the information f the sending terminal set and the information of the receiving terminal set, and
three of the information of the relay terminal set, the information of the sending terminal set and the information of the receiving terminal set.

2. A terminal device, comprising:
a memory, a processor, wherein the memory is configured to store instructions, and the processor is configured to execute instructions stored in the memory to execute the following steps:
receiving a first message sent by a second terminal, wherein a target terminal of the first message is a third terminal; and
determining whether to relay the first message to the third terminal according to indication information;
wherein the indication information is used to indicate signal quality information and at least one of:

geographic location information, information of terminal device sets to which a sending terminal, a relay terminal, and a receiving terminal belong, a set of specific resource pools, and a relay direction of a message;
wherein the information of terminal device sets to which the sending terminal, the relay terminal, and the receiving terminal belong comprises one of the following:
information of a relay terminal set,
information of a sending terminal set,
both of the information of the relay terminal set and the .information of the sending terminal set,
both of the information of the relay tern that set and information of a receiving terminal set,
both of the information of the sending terminal set and the information of the receiving terminal set, and
three of the information of the relay terminal set, the information of the sending terminal set and the information of the receivinm terminal set.

3. The terminal device according to claim 2, wherein the indication information is used to indicate the sitmal quality information and geographic location information;
the geographic location information comprises at least one of geographic location information of the terminal device, geographic location information of the second terminal, and geographic location information of the third terminal.

4. The terminal device according to claim 3, wherein the processor is further configured to execute the instructions stored in the memory to execute the following steps:
determining to relay the first message to the third terminal, if the geographic location information of the terminal device meets a first geographic location condition; or
determining not to relay the first message to the third terminal, if the geographic location information of the terminal device does not meet the first geographic location condition;
or the processor is further configured to execute the instructions stored in the memory to execute the following steps:
determining to relay the first message to the third terminal, if the geographic location information of the second terminal meets a second geographic location condition; or
determining not to relay the first message to the third terminal, if the geographic location information of the second terminal does not meet the second geographic location condition;
or the processor is further configured to execute the instructions stored in the memory to execute the following steps:
determining to relay the first message to the third terminal, if the geographic location information of the third terminal meets a third geographic location condition; or
determining not to relay the first message to the third terminal, if the geographic location information of the third terminal does not meet the third geographic location condition.

5. The terminal device according to claim 3, wherein the first geographic position condition, the second geographic position condition, and the third geographic position condition are configured by a network device, or pre-configured on the terminal device.

6. The terminal device according to claim 3, wherein the geographic location information is absolute geographic location information or relative geographic location information.

7. The terminal device according to claim 2, wherein the indication information is used to indicate the signal quality information and the information of terminal device sets to which the sending terminal, the relay terminal, and the receiving terminal belong;
wherein the relay terminal set is used to indicate a set of terminal devices capable of performing relay transmission on a received message, the sending terminal set is used to indicate a set of terminal devices that a message sent therefrom requires relay transmission, and the receiving terminal set is used to indicate a set of terminal devices that need to receive a message by means of relay transmission.

8. The terminal device according to claim 7, wherein the processor is further configured to execute the instructions stored in the memory to execute the following steps:
determining to relay the first message to the third terminal, if the terminal device belongs to the relay terminal set; or
determining not to relay the first message to the third terminal, it the terminal device does not belong to the relay terminal set;
or the processor is further configured to execute tile instructions stored in the memory to execute the following steps:
determining to relay the first message to the third terminal, if the second terminal belongs to the sending terminal set; or
determining not to relay the first message to the third terminal, if the second terminal does not belong to the sending terminal set;
or the processor is further configured to execute the instructions stored in the memory to execute the following steps:
determining to relay the first message to the third terminal, if the third terminal belongs to the receiving terminal set; or
determining not to relay the first message to the third terminal, if the third terminal does not belong to the receiving terminal set.

9. The terminal device according to claim 7, wherein the information of the relay terminal set, the information of the sending terminal set, and the information of the receiving terminal set are configured by a network device, or configured by the second terminal;
wherein the information of the relay terminal set, the information of the sending terminal set, and the information of the receive terminal set are identification information of terminal devices.

10. The terminal device according to claim 2, wherein the signal quality information comprises at least one of quality information of signal between the terminal device and the second terminal and quality information of signal between the terminal device and the third terminal.

11. The terminal device according, to claim 10, wherein the processor is configured to execute the instructions stored in the memory to execute the following steps:
determining to relay the first message to the third terminal, if the quality information of signal between the terminal device and the second terminal meets a first signal quality condition; or
determining not to relay the first message to the third terminal, if the quality information of signal between the terminal device and the second terminal does not meet the first signal quality condition;
or the processor is configured to execute the instructions stored in the memory to execute the following steps:

determining to relay the first message to the third terminal, if the quality information of signal between the terminal device and the third terminal meets a second signal quality condition; or determining not to relay the first message to the third terminal, if the quality information of signal between the terminal device and the third terminal does not meet the second signal quality condition.

12. The terminal device according to claim 11, wherein the first signal quality condition is a first signal quality threshold, and the second signal quality condition is a second signal quality threshold.

13. The terminal device according to claim 11, the first signal quality condition and the second signal quality condition are configured by a network device or pre-configured on the terminal device.

14. The terminal device according to claim 2, wherein the indication information is used to indicate the signal quality information and the set of specific resource pools, and the processor is further configured to execute the instructions stored in the memory to execute the following steps:

determining to relay the first message to the third terminal, if a sending resource pool of the first message belongs to the set of specific resource pools; or determining not to relay the first message to the third terminal, if the sending resource pool of the first message does not belong to the set of specific resource pools.

15. The terminal device according to claim 2, wherein the indication information is further used to indicate a maximum number of times of relay transmission, and the processor is further configured to execute the instructions stored in the memory to execute the following step:

stopping relaying the first message to the third terminal, when the number of times of relaying the first message reaches the maximum number of times;

wherein after the first message is received by the terminal device, the maximum number of times of relay transmission indicated by the indication information comprised in the first message is increased by one or decreased by one, and the modified first message is relayed to the third terminal.

16. The terminal device according to claim 2. wherein the processor is further configured to execute the instructions stored in the memory to execute the following step:

receiving the indication information sent by a network device; or receiving the indication information sent by the second terminal.

17. The terminal device according to claim 16, wherein the indication information is sent by the second terminal through a physical layer message, a media access control (MAC) message, a radio link control (RLC) message, a packet data convergence protocol (PDCP) message, an adaptation layer message or a PC5 signaling (PC5-S) message.

18. A non-transitory computer-readable storage medium, wherein it is configured to store one or more programs including instructions, and when the instructions are executed, it is used to execute the following steps:

receiving, by a first terminal, a first message sent by a second terminal, wherein a target terminal of the first message is a third terminal; and determining, by the first terminal, whether to relay the first message to the third terminal according to indication information;

wherein the indication information is used to indicate signal quality information and at least one of:

geographic location information, information of terminal device sets to which a sending terminal, a relay terminal, and a receiving terminal belong, a set of specific resource pools, and a relay direction of a message;

wherein the information of terminal device sets to which the sending, terminal, the relay terminal, and the receiving terminal belong comprises one of the following:

information of a relay terminal set, information of a sending terminal set, both of the information of the relay terminal set and the information of the sending terminal set, both of the information of the relay terminal set and information of a receiving terminal set, both of the information of the sending terminal set and the information of the receiving terminal set, and three of the information of the relay terminal set the information of the sending terminal set and the information of the receiving terminal set.

* * * * *